(12) United States Patent
Palmroth et al.

(10) Patent No.: US 9,618,941 B2
(45) Date of Patent: Apr. 11, 2017

(54) METHOD AND SYSTEM FOR ORIENTING A TOOL

(71) Applicant: John Deere Forestry Oy, Tampere (FI)

(72) Inventors: Mikko Palmroth, Tampere (FI);
Marko Paakkunainen, Tampere (FI);
Vesa Siltanen, Tampere (FI)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/831,725

(22) Filed: Aug. 20, 2015

(65) Prior Publication Data

US 2016/0054739 A1   Feb. 25, 2016

(30) Foreign Application Priority Data

Aug. 22, 2014  (EP) ..................... 14397525

(51) Int. Cl.
| | |
|---|---|
| *G05D 3/12* | (2006.01) |
| *A01G 23/00* | (2006.01) |
| *A01G 23/081* | (2006.01) |
| *E02F 3/43* | (2006.01) |
| *E02F 3/413* | (2006.01) |
| *E02F 3/96* | (2006.01) |
| *E02F 9/26* | (2006.01) |
| *G05B 19/00* | (2006.01) |

(52) U.S. Cl.
CPC .............. *G05D 3/12* (2013.01); *A01G 23/00* (2013.01); *A01G 23/081* (2013.01); *E02F 3/4135* (2013.01); *E02F 3/436* (2013.01); *E02F 3/437* (2013.01); *E02F 3/963* (2013.01); *E02F 9/265* (2013.01); *G05B 19/00* (2013.01)

(58) Field of Classification Search
CPC ........ G05D 3/12; A01G 23/00; A01G 23/081; E02F 3/436

USPC .......................................... 701/50
See application file for complete search history.

(56) References Cited

U.S. PATENT DOCUMENTS

| | | | |
|---|---|---|---|
| 6,140,787 A | 10/2000 | Lokhorst et al. | |
| 2014/0193231 A1* | 7/2014 | Yrjana | A01G 23/00 414/722 |
| 2016/0123352 A1* | 5/2016 | Erkkila | F15B 1/024 60/327 |

FOREIGN PATENT DOCUMENTS

| | | |
|---|---|---|
| EP | 0512584 A2 | 11/1992 |
| EP | 0512584 A3 | 11/1992 |
| EP | 0905325 A1 | 3/1999 |
| EP | 1889537 A2 | 2/2008 |
| EP | 1889537 A3 | 8/2008 |
| FR | 2683238 A1 | 5/1993 |
| WO | 2014118430 A1 | 8/2014 |

OTHER PUBLICATIONS

European Patent Office, Extended European Search Report dated Mar. 15, 2011 in Application No. 14397525.8.

* cited by examiner

*Primary Examiner* — Yazan Soofi
(74) *Attorney, Agent, or Firm* — Lorenz & Kopf, LLP

(57) ABSTRACT

A system and a method for controlling a tool pivotably mounted to an articulated boom connected to a work machine having a control unit. The solution: 1) determining the direction a predetermined point of the boom or the tool is moving to, i.e. the moving direction, and 2) controlling orientation of the tool as a function of one or several predetermined dependencies, the predetermined dependencies defining at least the orientation of the tool in relation to the moving direction. According to an example the work machine is a forest machine.

15 Claims, 7 Drawing Sheets

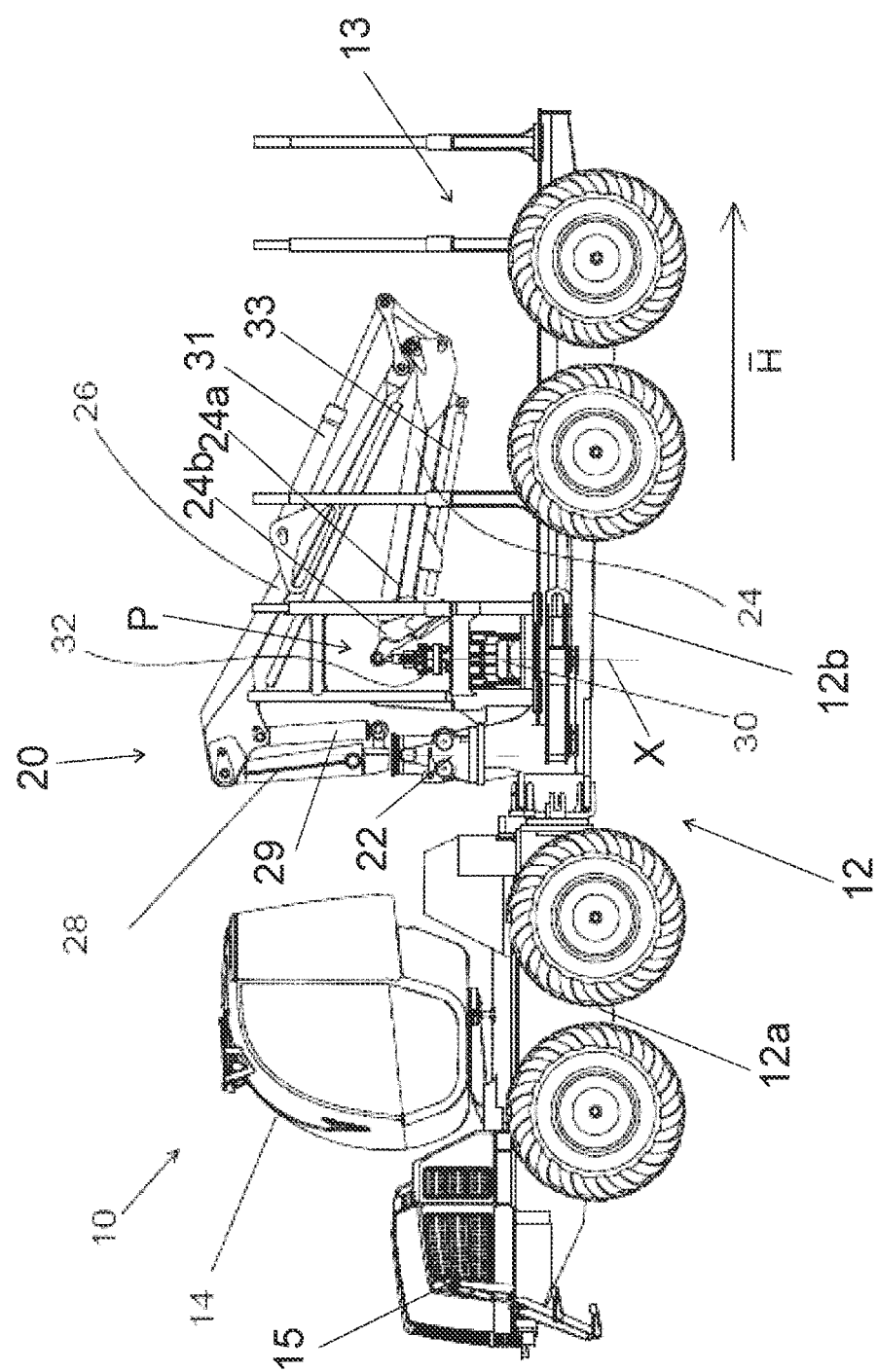

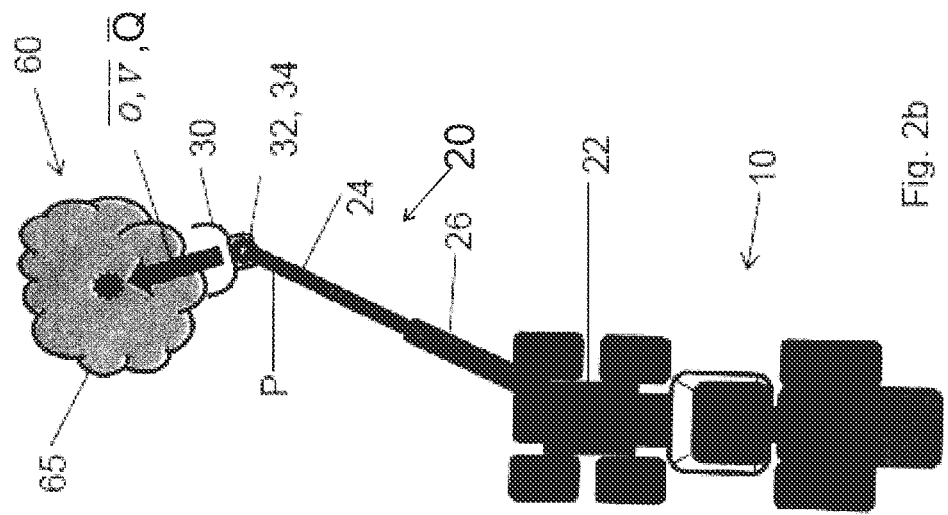
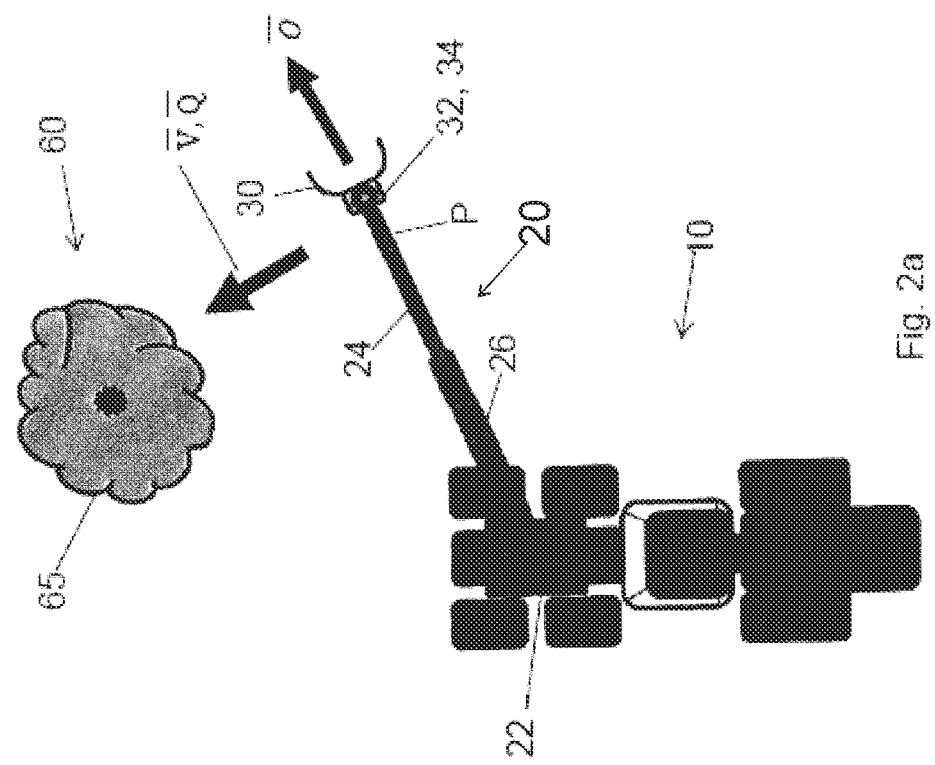

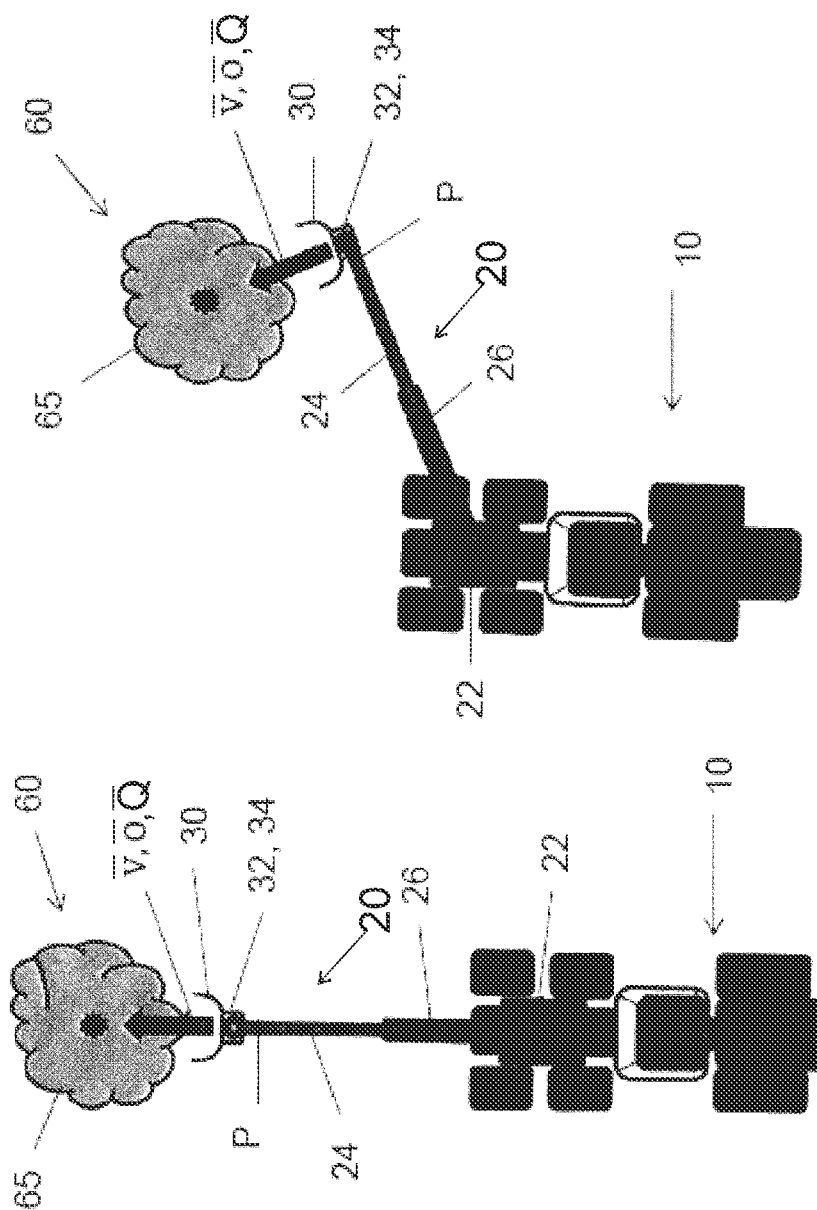

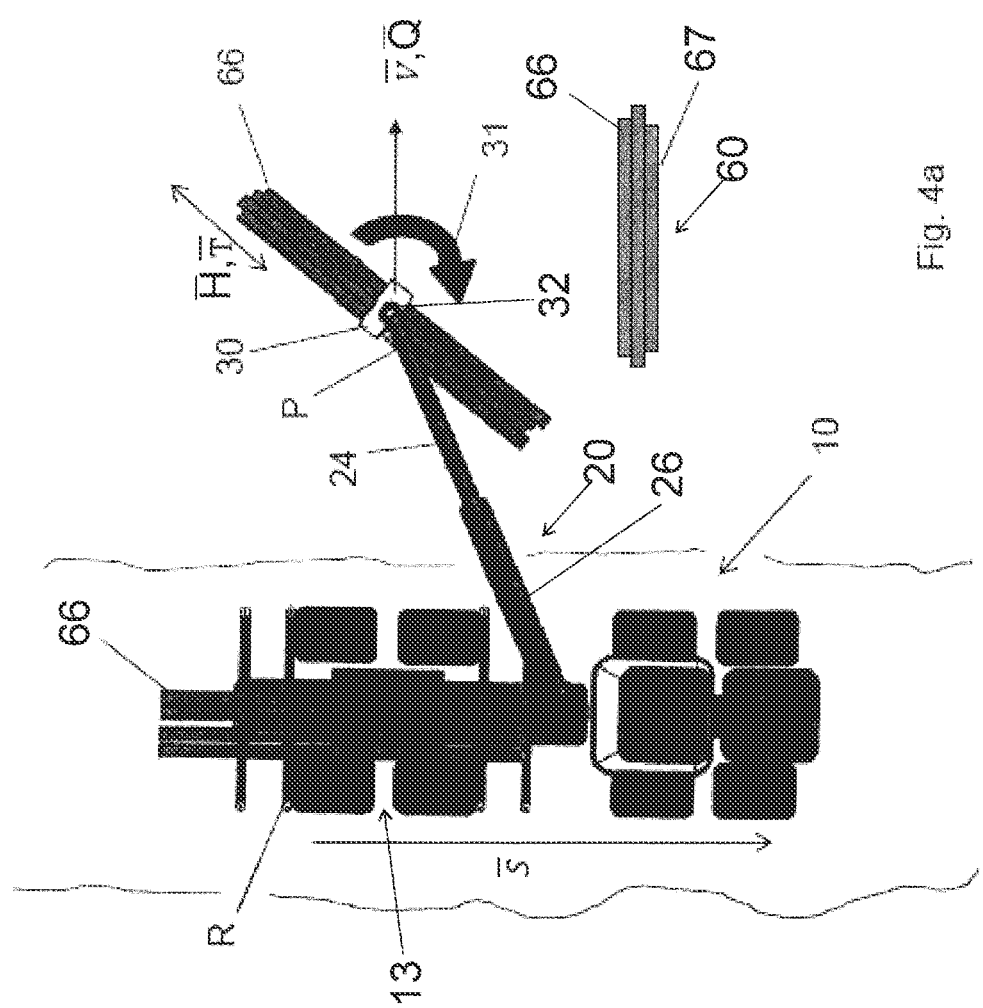

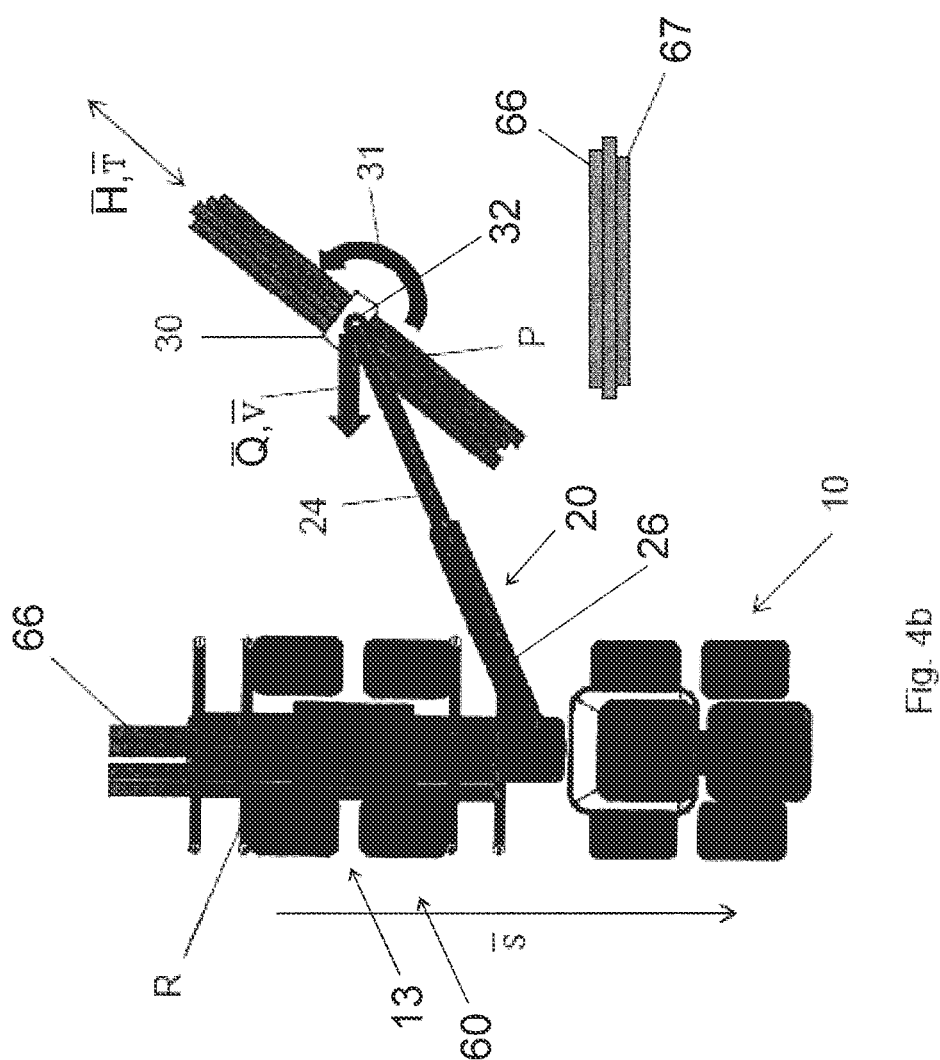

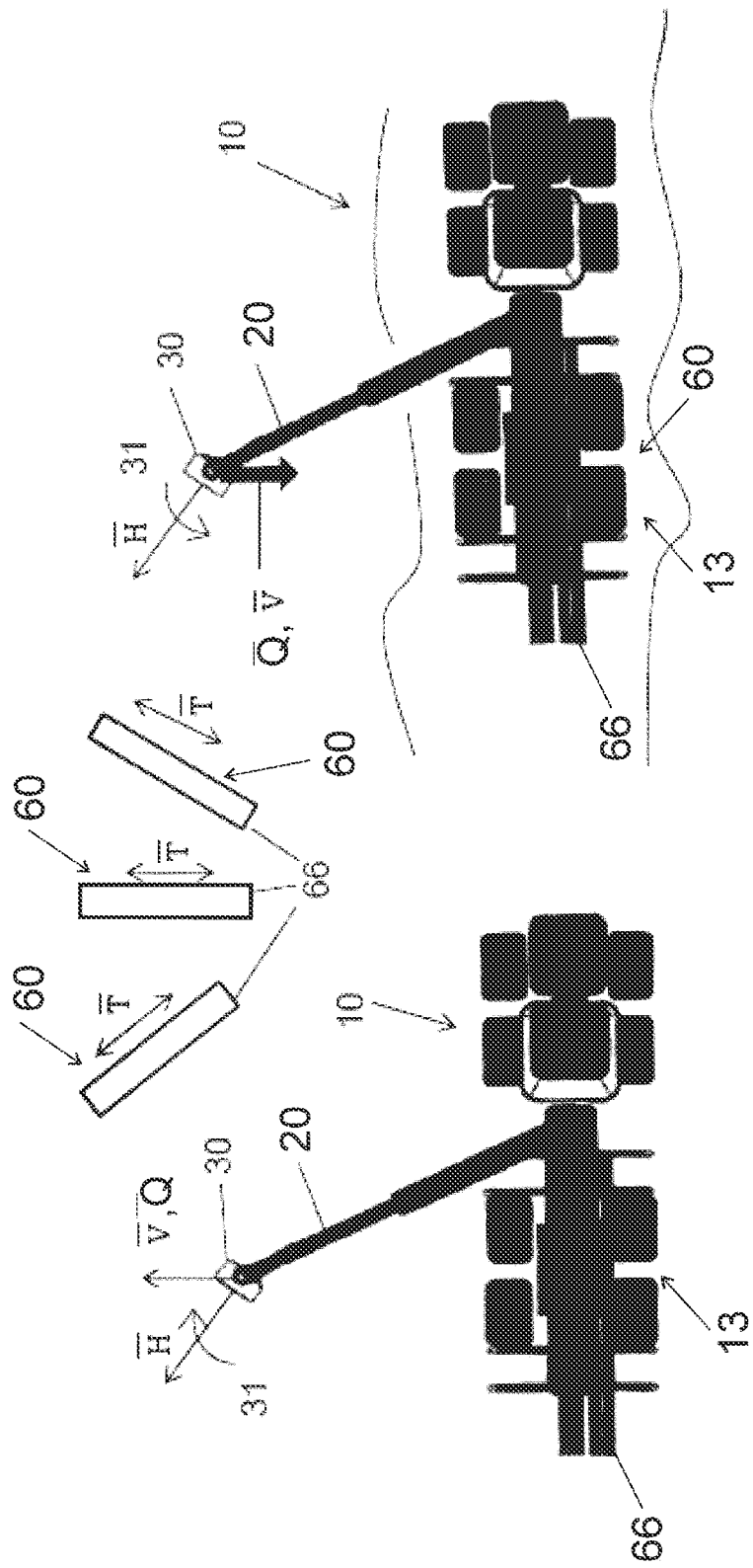

METHOD AND SYSTEM FOR ORIENTING A TOOL

CROSS-REFERENCE TO RELATED APPLICATION(S)

This application claims priority under 35 U.S.C. §119 to European Application No. 14397525.8, filed Aug. 22, 2015, and entire contents of which are incorporated herein by reference.

STATEMENT OF FEDERALLY SPONSORED RESEARCH OR DEVELOPMENT

Not applicable.

FIELD OF THE DISCLOSURE

The disclosure relates to a method for controlling a tool pivotably mounted to an articulated boom connected to a work machine having a control unit. The disclosure relates to a system for controlling a tool pivotably mounted to an articulated boom connected to a work machine. The disclosure relates to a work machine, particularly a forest machine. The disclosure relates to a computer program and a computer software product.

BACKGROUND OF THE DISCLOSURE

Work machines, in particular forestry equipment and forest machines, e.g. harvesters and forwarders, have an articulated boom and a tool at the tip of the boom. The tool can be e.g. a harvester head, a felling head, a harvesting and processing head, or a log grapple. The tool can be used e.g. to cut standing trees, to process felled trees or to grab objects, such as logs or tree trunks. When using such a tool, it is moved under the control of an operator of the work machine to a desired position mainly by controlling the position of the boom and moving the tool with the boom, and optionally also by moving the work machine. Thereafter, or meanwhile, also the tool itself must be oriented according to the need. The tool is correctly oriented in relation to e.g. a standing tree to be harvested or a log lying on the ground or in a pile.

It has been noticed that turning the tool to a correct orientation takes some time and may be somewhat cumbersome for the operator. Thus, the work machine is not efficiently used and/or not convenient to use. Furthermore, repetitive positioning of the tool during long work periods can cause operator fatigue, which may lead to decreased productivity.

SUMMARY OF THE DISCLOSURE

The solution to be presented is directed to overcoming one or more disadvantages noted above and associated with work machines having controllable tools.

According to the presented solution and the method, the direction a predetermined point of the boom or the tool is moving to, i.e. the moving direction, is determined, and the orientation of the tool, as a function of one or several predetermined dependencies, is controlled while the predetermined dependencies define at least the orientation of the tool in relation to the moving direction.

According to an example of the solution, the velocity of the predetermined point is determined together with the moving direction.

According to a further example of the solution, the predetermined point is the tip of the boom or the point of the boom the tool is connected to. For example, the tool may be a harvester head, a felling head, a harvesting and processing head, or a log grapple. For example, the work machine may belong to mobile forestry equipment and is a forest machine, for example a harvester or a forwarder. For example, the tool is adapted to handle logs, tree trunks or standing trees.

According to the presented solution, the system for controlling a tool pivotably mounted to an articulated boom connected to a work machine comprises a control unit adapted to automatically determine the direction a predetermined point of the boom or the tool is moving to, i.e. the moving direction, to control the orientation of the tool as a function of one or more predetermined dependencies, the predetermined dependencies defining at least the orientation of the tool in relation to the moving direction, and to generate control signals for controlling one or more actuators orienting the tool according to the one or more predetermined dependencies.

According to an example of the solution, the system has one or more sensors located in the boom or at the tool and operably connected to the control unit. The control unit is adapted to receive information or data indicative of the moving direction of the predetermined point or the orientation of the tool, or both, from the one or more sensors.

According to an example of the solution, the computer software product comprises a computer-readable medium and program code means stored in the computer-readable medium, wherein the computer software product is arranged to execute the steps of the method according to the presented solution, when said computer program is run in a control computer. According to an example, the control computer is the control unit of a forest machine. In the presented solution, for orienting of the tool, determining a target location for performing work with the tool can easily be made by an operator of the work machine. When the operator starts to move the boom towards the target location, e.g. a standing tree to be felled or a location for grapping, loading or unloading a log or a tree trunk. In this way, the moving direction of the predetermined point provides information on the relative position between the current location of the tool and the target location when the tool is being mounted at the predetermined point mentioned above. In this way, the tool can be oriented by using information on the moving direction of the predetermined point, e.g. the tip of the boom. The tool can be oriented e.g. with respect to the work machine to an orientation optimized for performing tasks.

The details of one or more embodiments are set forth in the accompanying drawings and the description below. Other features and advantages will become apparent from the description, the drawings, and the claims.

DESCRIPTION OF THE DRAWINGS

Reference will now be made to the examples which are illustrated in the accompanying drawings. Wherever possible, the same or corresponding reference numbers will be used throughout the drawings to refer to the same or corresponding parts or features.

FIGS. 1a, 1b show examples of work machines having a boom and a tool,

FIG. 2a shows a work machine having a tool, wherein the tool opens to an opening direction and a working location is located in another direction, FIG. 2b shows the work machine of FIG. 2a, wherein the working location is located in the opening direction of the tool, FIGS. 3a, 3b show a work machine having a tool arranged at the tip of a boom; and the moving direction of the tip of the boom, which moving direction points towards a working location, FIGS. 4a-4d show a work machine having a tool arranged at the tip of a boom and the moving direction of the tip of the boom during loading and unloading.

DETAILED DESCRIPTION

Figure 1A:
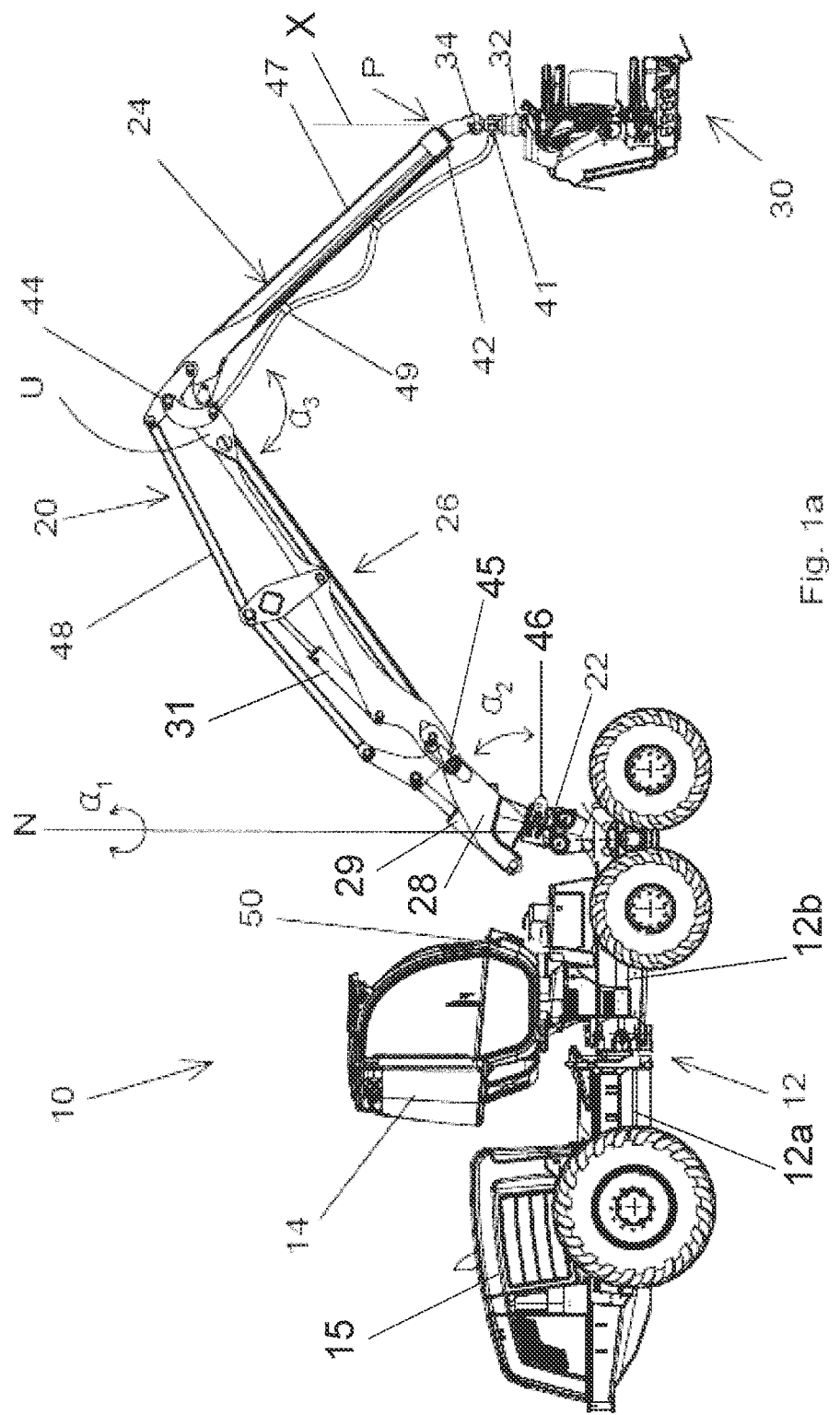

FIG. 1a shows an example work machine 10 in which the presented solution can be applied. The work machine may be a forest machine, for example a harvester.

FIG. 1b shows another example work machine 10 in which the presented solution can be applied. The work machine may a forest machine, for example a forwarder.

The work machine 10 comprises a frame 12, a cabin 14 with an operator's station, an engine 15 as the source of power and an articulated boom 20 on the frame 12. The frame 12 may be articulated and have two or more frame sections 12a, 12b connected one after the other by means of a controlled joint. The frame 12 is wheeled and supported by several wheels. Alternatively, the frame 12 may have an endless track arrangement for supporting the frame 12 and to drive the work machine 10. The work machine 10, as shown in FIG. 1b, may have a load space 13 located on the frame 12 or a frame section. The load space 13 may have several bunks for supporting a load. The load space 13 is for carrying logs or tree trunks loaded into the load space with a tool 30, especially a log grapple.

The boom 20 is mounted onto a slewing apparatus 22 connected to the frame 12. By turning the slewing apparatus 22, the boom 20 can be rotated about an axis N that is parallel to the surface normal of the plane on which the work machine 10 stands or moves. The axis N is oriented vertically or substantially vertically. In an example of the solution, the boom 20 with the slewing apparatus 22 may further be mounted on a tilting apparatus connected to the frame for tilting the boom 20 such that the axis N is controllably tilted.

The boom 20 may have two or more boom sections connected one after the other. Two or more boom sections are connected to each other by means of joint arrangements controlled by means of one or several actuators, e.g. a cylinder actuator.

In the examples of FIGS. 1a and 1b, the boom 20 has a base section 28 connected between the slewing apparatus 22 and a second boom section 26. The orientation of the second boom section 26 in relation to the base section 28 is controlled by a cylinder actuator 29. The cylinder actuator 29 is connected between the base section 28 and the second boom section 26. Alternatively, the second boom section 26 is connected to the slewing apparatus 22 without a base section and the cylinder actuator 29 is connected between the second boom section 26 and e.g. the slewing apparatus 22. A first boom section 24 is connected to the second boom section 26. The orientation of the first boom section 24 in relation to the second boom section 26 is controlled by a cylinder actuator 31. The cylinder actuator 31 is connected between the second boom section 26 and, either directly or via a joint arrangement, the first boom section 24.

One or more boom sections of the boom 20 may operate telescopically. The extension and the length of the telescopically operating boom section is controlled by means of two or more boom section parts arranged movably within each other. One or several actuators, e.g. cylinder actuators, may be used to control the relative positions of the boom section parts. The cylinder actuator is connected to the boom section with boom section parts and the cylinder is located either inside or outside the boom section. A tool may be connected to the tip of the boom section part representing the tip of the boom 20.

According to an example and FIG. 1b, the first boom section 24 is arranged telescopically operating. The first boom section 24 has two boom section parts 24a, 24b controlled by a cylinder actuator 33.

In the presented solution, the tool 30 is connected to the boom 20. Preferably, the tool is connected at the end of the boom 20 or the first boom section 24 and represented by the tip P of the boom 20. The tool 30 is rotatably connected to the tip P of the boom 20 by means of an actuator 32, e.g. a rotator. With the actuator 32, the tool 30 suspended to the actuator 32 can be controllably rotated about a rotation axis X that is typically oriented vertically or substantially vertically. The orientation of the tool 30 is thus controlled with the actuator 32.

According to an example and FIG. 1a or 1b, the actuator 32 may be connected to the tip P via a link 34 (see FIG. 1a). The link 34 provides free orientation of the actuator 32 and the tool 30 with respect to the boom 20 such that the rotation axis X and the actuator 32, and the tool 30 connected to the actuator 32, are able to maintain their upright, vertical position.

The tool 30 may be a harvester head, a felling head, a harvesting and processing head, a harvester head suitable to be used as a log grapple, or a log grapple. The tool 30, grabbing a standing tree from a side, needs to be oriented e.g. towards the tree standing vertically. A predetermined side of the tool 30 faces the standing tree. According to an example and FIG. 1a, the tool 30 is a harvester head for harvesting and processing trees by grabbing, felling, delimbing and cutting. According to another example and FIG. 1b, the tool 30 is a log grapple for grabbing, transferring, loading and unloading logs, tree trunks or cut timber. The log grapple, grabbing a log or a tree trunk from above, needs to be oriented e.g. according to the longitudinal direction of the log or the tree trunk lying horizontally.

The tool 30 may have two or more arms pivotally connected to a housing of the tool 30 for grabbing a tree, a log or a tree trunk e.g. from two opposite sides. A mechanism driven by an actuator, e.g. a motor or a cylinder actuator, is connected to the housing for moving the arms to an open position and a closed position. In a harvester head, the arms may be additionally constructed as delimbing blades.

The tool 30 may further have tilting devices for changing the orientation of the tool 30 or the arms from a horizontal direction to a vertical direction and vice versa. Thus, a harvester head can grab logs or tree trunks lying horizontally and a log grapple can grab logs or tree trunks standing vertically.

One or more boom sections of the boom 20 operate by raising and lowering a tool or another boom section connected to the boom section. The raising and lowering takes place on a vertical or substantially vertical plane. According to an example and FIG. 1a and 1b, the second boom section 26 is pivotably connected to the base section. In this way, the height of the end U of the second boom section 26 can be controlled by turning the second boom section 26 about an axis that is perpendicular or transversal to the axis N, thus horizontal or substantially horizontal during operation of the work machine 10. The second boom 26 is pivotably connected to the first boom section 24. In this way, the height of the tip P of the first boom section 24 and the boom 20 can be controlled by turning the first boom section 24 about an axis that is perpendicular or transversal to the axis N.

One or more control joysticks, or other control devices, at the operator's station may be used by an operator to move the boom 20, the tip P of the boom or the tool 30 towards a target location. The joysticks and control devices may be operably connected with a control unit 50 of the work machine 10 and located e.g. in the cabin 14 or on the frame 12. A display may be connected to the control unit 50 for showing information and data to the operator. The control unit 50 is operably connected with various actuators associated with the boom 20 and other components of the work machine 10. Control signals from the joysticks and the control devices are communicated to the control unit 50, and the control unit 50 is operable to responsively control the various actuators to rotate the boom 20, move and change the position of the boom 20 and the tool 30, rotate the tool 30 and operate the tool 30 for performing work or grabbing with the arms of the tools 30.

The control unit 50 may a programmable microprocessor-based device with a memory device and associated computer program code, for generating control signals to responsively control the various actuators. The computer program code may be in a form of a control program or a control algorithm, or appropriate computer software, running or being executed under the control of a control computer, i.e. the control unit. The associated computer program code may be embodied on a computer readable medium. The control unit 50 may have a distributed configuration with several subunits communicating with each other's. In the context of this description, the term "automatic" refers to control methods performed by the control unit 50 based on the input information received by the control unit, e.g. from sensors. The control unit utilizes the generated control signals to automatically implement the control methods.

The actuators may be motors or cylinder actuators utilizing hydraulic energy and pressurized medium which is transmitted to the actuator by means of e.g. lines and flexible hoses. An apparatus needed for generating the hydraulic energy is placed in e.g. the frame 12 or is operatively connected to the engine 15. Hydraulic energy is distributed e.g. in the form of pressurized medium to the actuators via a control circuit presenting necessary valves and components for controlling the flow of the pressurized medium. Some actuators may utilize electric energy stored in an accumulator or generated with a generator operatively connected to the engine 15. The control circuit is controlled based on control signals from the control unit under the control of the operator or the automatic control of the control unit.

An embodiment of the presented solution will now be discussed with reference to FIGS. 2a, 2b, 3a and 3b.

FIG. 2a shows a work machine 10 having a tool 30 pivotably mounted to a tip P of a boom 24 via an actuator 32. The work machine 10 with the tool 30 may be a forest machine according to the examples explained above or the harvester referred to above in the context of FIG. 1a. The tool 30 is used for grabbing a standing tree 65, particularly the trunk of the tree 65. Consequently, the tree 65 defines a target for the tool 30, more specifically a target location 60 for performing work with the tool 30, e.g. for grabbing and felling the tree 65.

The tool 30 may have a predetermined opening direction $\overline{O}$ defining e.g. a direction from which the tool 30 can receive an object, e.g. the tree 65. Throughout this description, overlining "‾" is used to denote a vector. The actuator 32 may be used to change the direction of the tool 30. In the case of the tool 30 having arms for grabbing the object the opening direction $\overline{O}$ defines a direction from which the object, e.g. a tree trunk, may be received between the arms in the opened position of the tool 30. Preferably, the tree trunk is perpendicularly or transversally oriented in relation to the opening direction $\overline{O}$.

The tool 30 may have a predetermined holding direction $\overline{H}$ defining the orientation for the longitudinal direction of the object that can be handled by the tool 30. The actuator 32 may be used to change the orientation of the tool 30. In the case of the tool 30 having arms from grabbing an object, e.g. a log 66 or a tree trunk (see FIG. 4a), the holding direction $\overline{H}$ defines the orientation of the object than can be received between the arms in the opened position of the tool 30 or that are being held between the arms in the closed position of the tool 30.

When the tool 30 is holding a longitudinal object, or several longitudinal objects, the holding direction $\overline{H}$ of the tool 30 is parallel to the longitudinal direction T of the object as seen in FIGS. 4a to 4d. It is understood, that the term "parallel" refers to both unidirectional vectors extending in the same direction, and to vectors that extend in reverse directions.

According to an example of the presented solution, the orienting of the tool 30 takes places automatically while the operator takes care of controlling the boom 20 to move a predetermined point of the boom 20, the tool 30 or the tip P of the boom 20 to a direction chosen by the operator, i.e. the moving direction $\overline{Q}$. Preferably, the tool 30 is moved towards a specific target, e.g. the target location 60.

The tool 30 is automatically controlled according to a predetermined dependence defining the orientation of the tool 30 in relation to the moving direction $\overline{Q}$. The tool 30 may be controlled such that it for example realizes one or several of the following examples:

1) the tool 30 is controlled such that it eventually faces to the moving direction $\overline{Q}$,
2) the opening direction $\overline{O}$ of the tool 30 and the moving direction $\overline{Q}$ are preferably parallel, or substantially parallel, and have substantially the same direction,
3) the tool 30 maintains its predetermined orientation, e.g. a predetermined angular orientation, relative to the moving direction $\overline{Q}$,
4) the tool 30 maintains its predetermined orientation of the opening direction $\overline{O}$, e.g. a predetermined angular orientation, relative to the moving direction $\overline{Q}$,
5) the tool 30 maintains its predetermined orientation of the holding direction $\overline{H}$, e.g. a predetermined angular orientation, relative to the moving direction $\overline{Q}$,
6) the tool 30 is controlled such that the holding direction $\overline{H}$ of the tool 30 is perpendicular, substantially perpendicular or transversal to the moving direction $\overline{Q}$,
7) the tool 30 is turned to a predetermined orientation, e.g. a predetermined angular orientation, relative to the orientation of the object to be handled and located at the target location 60, and
8) the tool 30 is turned to a predetermined orientation, e.g. a predetermined angular orientation, relative to the orientation of a predetermined device or object located at the target location 60.

The examples 1), 2) and 4) apply at least to the examples of FIGS. 2a to 3b. The example 3) applies at least to the examples of FIGS. 2a to 4d. The example 5) applies at least to the examples of FIGS. 4a to 4d and the example 6) applies at least to the examples of FIGS. 4b and 4c. The example 7) applies at least to the examples of FIGS. 4c and 4d and the example 8) applies at least to the examples of FIGS. 4a and 4b. For example, the predetermined angular orientation in FIGS. 2a, 2b and 4a may be 0 degrees and in FIGS. 4b and 4c 90 degrees. In the examples to be explained below, the tip P of the boom 20 represents the predetermined point discussed above.

Furthermore, before applying the examples listed above, the tool 30 may have been controlled to an initial orientation in which e.g. the opening direction $\overline{O}$ or the holding direction $\overline{H}$ are set and later maintained when applying the examples listed above. For example, the opening direction $\overline{O}$ is directed downwards in the vertical direction, see the examples of FIGS. 4a to 4d, or the opening direction $\overline{O}$ is horizontally or substantially horizontally oriented, see the examples of FIGS. 2a to 3b. Preferably, the tool 30 is constructed such that the holding direction $\overline{H}$ is perpendicular, substantially perpendicular or transversal to the opening direction $\overline{O}$. Thus, the holding direction $\overline{H}$ is maintained substantially vertical in the examples of FIGS. 2a to 3b, or substantially horizontal in the examples of FIGS. 4a to 4d. The initial orientation of the tool 30 may be set manually by the operator or automatically the control unit 50. According to another example the orientation of tool 30, or the boom 20, is determined first and the automated control explained above is adapted according to the determined orientation.

FIG. 2a shows an example case for the location of the target location 60 in relation to the work machine 10. The target location 60 is represented by the standing tree 65. The tool 30 is intended to grab the tree 65. When the operator of the work machine 10 notices the target location 60, he/she starts to move the tool 30 with the boom 24 towards the target location 60. As the boom 24 moves, the tip P of the boom 24 has a velocity $\overline{V}$ with the moving direction $\overline{Q}$. As shown in FIG. 2a, the moving direction $\overline{Q}$ of the tip P and the opening direction $\overline{O}$ of the tool 30 are not necessarily parallel. However, as indicated in FIG. 2b, the tool 30 needs to be turned (i.e. oriented) towards the target location 60. Thus, the tool 30 needs to be oriented in such a way that the opening direction $\overline{O}$ becomes more unidirectional (i.e. parallel and pointing to the same direction) to the moving direction $\overline{Q}$ of the tip P.

FIGS. 3a and 3b show two other example cases for the location of the target location 60 in relation to the work machine 10. The target location 60 is represented by the standing tree 65. The tool 30 is intended to grab the tree 65. As shown in FIG. 3a, the moving direction $\overline{Q}$ of the tip P having the velocity $\overline{V}$ and the opening direction $\overline{O}$ of the tool 30 are already parallel. However, the tool 30 needs to be maintained turned (i.e. oriented) towards the target location 60. Thus, the tool 30 needs to be oriented in such a way that the opening direction $\overline{O}$ remains unidirectional (i.e. parallel and pointing to the same direction) with the moving direction $\overline{Q}$.

In the examples presented by FIGS. 2a, 2b, 3a and 3b, either the work machine 10 or the boom 20, or both of them, are moving. In the cases of FIGS. 2a, 2b and 3b, the boom 20 needs to be rotated for reaching the target location 60. In the case of FIG. 3a, the boom 20 needs not to be rotated for reaching the target location 60 but either the position of the boom 20 must be changed or the work machine 10 must be driven towards the target location for reaching the target location 60.

In this way, according to a further example of the solution the orienting of the tool 30 takes place by decreasing the angle between the moving direction $\overline{Q}$ and the opening direction $\overline{O}$ of the tool 30. The angle is decreased by turning the tool 30 connected to the tip P. According to a further example of the solution the angle is decreased to less than 30 degrees, to less than 15 degrees or to less than 5 degrees. According to a further example of the solution the tool 30 in turned such that the opening direction $\overline{O}$ becomes unidirectional to the moving direction $\overline{Q}$ of the tip P or the tool 30 moving with the velocity $\overline{V}$.

According to a further example of the solution, the tool 30 is automatically turned under the control of the control unit 50 of the work machine 10. One or more control signals generated by the control unit 50 are communicated to one or more respective actuators to turn the tool 30. In the examples explained above, the actuator 32 to which the tool 30 is connected is rotated under the control of the generated control signals for turning the tool 30 to a predetermined direction as mentioned above. The control signals may be generated in such a way that the angle between the opening direction $\overline{O}$ and the moving direction $\overline{Q}$ decreases to the aforementioned value.

According to the examples described above, the tool 30 is preferably oriented without information or data indicative of the target location 60, e.g. coordinate or two-dimensional information. It is noted that the moving direction $\overline{Q}$ with the velocity $\overline{V}$ implies the direction of the target location 60 as seen from the tool 30 or the tip P. That is, only one-dimensional information of the target location, but not the location of the target location 60 itself, either in two dimensions (e.g. without the information on height) or in three dimensions, is utilized. It should be noted that the target location 60 may be an arbitrary location selected by the operator. It is not always necessary to define the target location 60 as a location with well-defined absolute or relative position. The target location 60 may merely be a location in the direction of the moving direction $\overline{Q}$.

According to a further example of the solution, the location of the target location 60 may be indicated also by other means than by moving the boom 20. Then, information or data indicative of a target location is communicated to the control unit 50 of the work machine 10. According to one example, the operator feeds the necessary information or data to the control unit by using e.g. the control devices of the operator's station. According to a further example, the target location is indicated as coordinate or two-dimensional information having a specific point e.g. in the work machine 10, the boom 20, the tip P or the tool 30 as a reference point known by the control unit.

Thus, based on the indicated information or data, the moving direction $\overline{Q}$ from the tool 30 to the target location 60 is determined automatically by the control unit 50. The moving direction $\overline{Q}$ may be determined continually or repeatedly as the position of the tool 30 changes when the boom changes its position with respect to the target location 60. At the same time, the orientation of the tool 30 is controlled based on the predetermined dependence.

Additionally or alternatively, the operator may feed information or data indicative of the predetermined orientation, e.g. the predetermined angular orientation, of the tool 30, the predetermined orientation relating to one or more examples 1) to 8) mentioned above.

The tool 30 is controlled e.g. according to one or more of the examples 1) to 8) presented earlier. The tool 30 may be turned with respect to the boom 20 in such a way that the angle between the opening direction $\overline{O}$ and the moving direction $\overline{Q}$ will decrease by said turning. The angle may decrease to less than 30 degree, less than 15 degrees, or less than 5 degrees; or the opening direction $\overline{O}$ may be turned unidirectional to the moving direction $\overline{Q}$.

In the examples and FIGS. 2a, 2b, 3a and 3b mentioned above, the moving direction $\overline{Q}$ and the opening direction $\overline{O}$ are preferably horizontally or substantially horizontally oriented and transversal to the longitudinal direction of a standing tree. Furthermore, in the examples and FIGS. 4a, 4b, 4c and 4d to be explained later, the moving direction $\overline{Q}$ and the holding direction $\overline{H}$ of the tool 30 are preferably horizontally or substantially horizontally oriented.

Another embodiment of the presented solution will now be discussed with reference to FIGS. 4a, 4b, 4c and 4d.

FIGS. 4a to 4d 4b show a work machine 10 having a boom 20 and a tool 30 pivotally mounted to a tip P of the boom 20 via an actuator 32. The work machine 10 with the tool 30 may be a forest machine according to the examples explained above or the forwarder referred to above in the context of FIG. 1b. The tool 30 is used for grabbing one or more lying logs 66 for loading, unloading or moving the logs. The tool 30 is further used for releasing the one or more logs 66 grabbed by the tool to a selected location or target, e.g. the target location 60. Consequently, the pile 67 with logs 66 in FIG. 4a, the load space 13 in FIGS. 4b and 4c, or the log 66 in FIG. 4d defines the target location 60 for performing work with the tool 30, e.g. for unloading a log 66 or logs held by the tool 30.

The tool 30 in the examples of FIGS. 4a to 4d may have the predetermined opening direction $\overline{O}$ mentioned above and defining e.g. a direction from which the tool 30 can receive an object, e.g. the log 66 lying on the ground, in a pile 67 or in the load space 13. Further, the opening direction $\overline{O}$ is directed downwards in the vertical direction in FIGS. 4a to 4d. The actuator 32 may be used to change the orientation of the tool 30. In the case of the tool 30 having arms for grabbing the object the opening direction $\overline{O}$ defines a direction from which the object, e.g. a log, may be received between the arms in the opened position of the arms and the tool 30. Preferably, the log is perpendicularly or transversally oriented in relation to the opening direction $\overline{O}$. More preferably, the tool 30 is oriented e.g. according to the longitudinal direction of the log lying horizontally.

The tool 30 may have the predetermined holding direction $\overline{H}$ mentioned above and defining the orientation for the longitudinal direction of the object that can be grabbed and picked up by the tool 30 or are held by the tool 30, e.g. in the closed position of the tool 30. The actuator 32 may be used to change the orientation of the tool 30 such that the holding direction $\overline{H}$ has a selected orientation. In the closed position, the tool 30 is arranged to hold the log 66 in such a way that the longitudinal direction $\overline{T}$ of the log 66 is parallel to the holding direction $\overline{H}$ of the tool 30.

FIG. 4a shows the work machine 10 having the tool 30. FIG. 4a shows unloading the logs 66 from the load space 13 of the work machine 10 to the pile 67 with logs 66 defining the target location 60. According to the presented example unloading situation, the work machine 10 stands on a road, and the pile 67 is arranged at a side of the road. Moreover, the pile may be oriented in such a way that the logs 66 in the pile are perpendicular or transversal to the road, or, the longitudinal direction of the work machine 10. Furthermore, during unloading, the orientation of the work machine 10 may be parallel to the road. The work machine 10 may have a predetermined work machine orientation $\overline{S}$ defining e.g. the longitudinal or moving direction of the work machine 10, or the longitudinal direction of the objects, e.g. logs 66, in the load space 13 of the work machine 10. The work machine orientation $\overline{S}$ represents the orientation of the predetermined device or object located at the target location 60 as mentioned above. Thus, when unloading in the example of FIG. 4a, the logs 66 need to be turned approximately 90 degrees about a vertical axis, e.g. the axis X (see FIG. 1b).

Thus, the holding direction $\overline{H}$ of the tool 30 is turned to a predetermined orientation in relation to the work machine orientation $\overline{S}$. According to another example, this turning may be automated by using e.g. the moving direction $\overline{Q}$ as discussed above. Thus, the holding direction $\overline{H}$ of the tool 30 is turned to a predetermined orientation in relation to the moving direction $\overline{Q}$. The holding direction $\overline{H}$ may be turned towards e.g. a perpendicular or transversal alignment to the work machine orientation $\overline{S}$, as shown in FIG. 4a, or a parallel or substantially parallel alignment to the work machine orientation $\overline{S}$. In the latter case, the tool 30 may maintain the holding direction $\overline{H}$ or the longitudinal direction $\overline{T}$ of the object aligned with the work machine orientation $\overline{S}$.

FIG. 4b shows loading the logs 66 to the load space 13 of the work machine 10 from the pile 67 with logs 66. The load space 13 defines the target location 60. According to the presented example loading situation, the pile 67 may be oriented in such a way that the logs 66 in the pile are perpendicular or transversal to the longitudinal direction of the work machine 10 or the work machine orientation $\overline{S}$. Thus, in the example of FIG. 4b, the logs 66 need to be turned approximately 90 degrees about a vertical axis, e.g. the axis X.

The holding direction $\overline{H}$ of the tool 30 is turned to a predetermined orientation in relation to the work machine orientation $\overline{S}$. According to another example, this turning may be automated by using e.g. the moving direction $\overline{Q}$ as discussed above. Thus, the holding direction $\overline{H}$ of the tool 30 is turned to a predetermined orientation in relation to the moving direction $\overline{Q}$. The holding direction $\overline{H}$ may be turned towards e.g. a parallel or substantially parallel alignment to the work machine orientation $\overline{S}$ as shown in FIG. 4b.

It is noted that also other quantities related to the work machine 10, the boom 20 or the tool 30 may be used in connection with the examples presented above when automatically controlling the tool 30. For example, the states of the work machine 10 represented by the loading and unloading situations presented above may be automatically determined by the control unit 50 of the work machine 10. According to another example, the operator feeds the necessary information or data to the control unit by using e.g. the control devices of the operator's station. The information or data in question may select or define the current state of the work machine 10, e.g. from a group of predetermined states. The state selected, defined or automatically determined at each occasion may be used by the control unit 50 to select a predetermined type of control for the tool. According to a further example, the operator feeds information or data to the control unit 50, e.g. by selecting an option from a group of predetermined options, for selecting a predetermined type of control. The predetermined type of control may then be one of the examples 1) to 8) presented above.

Referring to FIG. 4a, the unloading state may be determined from the direction of the moving direction $\overline{Q}$ and the location of the tip P with respect to a work machine location R defining the location of a predetermined part of the work machine 10. Unloading occurs when the tool 30 is in the closed position and the moving direction $\overline{Q}$ is so directed that the distance between the machine location R and the tip P increases. In particular, unloading may be determined when the tool 30 is closed and the moving direction $\overline{Q}$ forms an angle with the direction from the machine location R to the location of the tip P. The angle may be less than 80 degrees, less than 60 degrees or less than 45 degrees. Preferably, the machine location R refers to the location of the centre of the load space 13.

Referring to FIG. 4c, the unloading state may also be determined when the tool 30 is in the open position and the moving direction $\overline{Q}$ is so directed that the distance between the machine location R and the tip P decreases. Thus, the tool 30 is unloading the logs 66 held in the load space 13.

In a similar manner, and referring to FIG. 4b, the loading state of the work machine 10 may be determined when the tool 30 is in the closed position and the moving direction $\overline{Q}$ is so directed that the distance between the machine location R and the tip P decreases. In particular, loading may be determined when the tool 30 is closed and the moving direction $\overline{Q}$ forms an angle with the direction from the tip P to the machine location R. The angle may be less than 80 degrees, less than 60 degrees or less than 45 degrees. Preferably, the machine location R refers to the location of the centre of the load space 13.

Referring to FIG. 4d, the loading state of the work machine 10 may also be determined when the tool 30 is in the open position and the moving direction $\overline{Q}$ is so directed that the distance between the machine location R and the tip P increases. Thus, the tool 30 is loading the logs 66 into the load space 13.

According to an example of the presented solution, the location of the tip P of the boom 20 with respect to the work machine location R or a predetermined part of the work machine 10 or the holding direction $\overline{H}$ of the tool 30, or two or more of them, may further be used to improve safety and generating observable, e.g. audible or visible, warning signals. The control unit 50 automatically controls the controls signals and determines whether they are necessary. The work machine location R may be defined by the cabin 14 of work machine 10 or the predetermined part may be the cabin 14.

For example, the control unit 50 may produce a warning signal, when the holding direction $\overline{H}$ of the tool 30 is parallel or substantially parallel to the direction from the tip P of the boom 20 to the work machine location R or the predetermined part of the work machine 10. Preferably, the tool 30 is in a closed position with one or several logs or tree trunks, or the tool 30 is in a state moving the log or tree trunk, e.g. towards the work machine location R or the predetermined part. The former case applies to an example case where the tool 30 has devices for driving the tree trunk held in the tool 30 in the longitudinal direction, i.e. the longitudinal direction T, of the tree trunk. Additionally or alternatively, the control unit 50 may produce a warning signal when the holding direction $\overline{H}$ of the tool 30 is perpendicular or substantially perpendicular to the direction from the tip P of the boom 20 to the work machine location R or the predetermined part of the work machine 10. Preferably, the tool 30 is in a closed position with one or several logs or tree trunks. The case applies to an example case where the tool 30 has devices for cross-cutting the tree trunk held in the tool 30. The longitudinal direction, i.e. the longitudinal direction T, of the tree trunk and the holding direction $\overline{H}$ of the tool 30 are preferably horizontal or substantially horizontal.

Additionally or alternatively, the control unit 50 may produce a warning signal when the distance from the tip P to the work machine location R or the predetermined part of the work machine 10 is smaller than a predetermined distance value. Preferably, the tool 30 is in a closed position with one or several logs or tree trunks and the holding direction $\overline{H}$ of the tool 30 is horizontally or substantially horizontally oriented.

Additionally or alternatively, the control unit 50 may be configured to stop or prevent the tool 30 from being controlled to move to a position or orientation resulting to one or more example situations explained above in context with the warning signal. Additionally or alternatively, the control unit 50 may be configured to disable the functioning of the tool 30 or devices in the tool 30 for preventing the actions related to the example situations explained above. The devices in the tool 30 may include the driving devices or the cross-cutting devices mentioned above.

Related to the boom 20 and the various examples presented above, for receiving data or information indicative of at least the moving direction $\overline{Q}$ of e.g. the tip P of a boom 20 and data or information indicative of the orientation of the tool 30 with respect to e.g. the boom 20, one or more sensors may be in use. The sensors are operably connected to the control unit 50 and e.g. electrical signals from the sensors are communicated to the control unit 50. The control unit is able to determine the moving direction $\overline{Q}$ or the orientation of the tool 30 as a function of the received data or information. The determination may be based on calculations related to the geometry of the boom 20 or the electrical signals from the sensors, or both.

In the above, the sensor may be a device arranged to measure a value. The sensor may actively send, via a wire or wirelessly, information or data to the control unit 50. In addition or alternatively, the sensor may provide, in response to a signal e.g. from the control unit 50, the information or the data to the control unit 50. The sensor may transmit the information or the data directly or indirectly, e.g. via a link device, to the control unit 50.

An example arrangement of the sensors is presented referring to FIG. 1a showing the boom 20. The arrangement may comprise an orientation sensor 41 arranged to determine the orientation of the tool 30 e.g. with respect to the boom 20. The orientation sensor 41 may be located in or at the actuator 32. The orientation of the actuator 32 sensed by the orientation sensor 41 may be dependent on the orientation of the tool 30. Thus, the orientation of the tool 30, the holding direction $\overline{H}$ or the opening direction $\overline{O}$ is determined by the orientation sensor 41. The output of the orientation sensor 41, i.e. information or data indicative of the orientation of the tool 30, may be used in the control unit 50.

Furthermore, the arrangement may comprise one or more sensors to determine the moving direction $\overline{Q}$ and, when necessary, the velocity $\overline{V}$ (e.g. the magnitude of the velocity $\overline{V}$) associated with the moving direction $\overline{Q}$ of the predetermined point, e.g. the tip P of the boom 20. The moving direction $\overline{Q}$ or the velocity $\overline{V}$, or both, may be determined from one or more of the following measured quantities:

the acceleration of the predetermined point, since velocity is a time integral of the acceleration, the position of the predetermined point, since velocity is a time derivative of the position, the velocity of the predetermined point, and the successive positions or coordinate locations of the predetermined point.

Thus, the sensor may be in the form of an acceleration sensor or a navigation system sensor, e.g. a GPS sensor (Global Positioning System). Additionally or alternatively, the moving direction $\overline{Q}$ or the velocity $\overline{V}$ may be determined based on the actions of the operator for moving the boom 20 and the tool 30. The actions of the operator are reflected in the electrical signals originating from the control joysticks or the control devices and communicated to the control unit 50. The control joysticks and the control devices may have sensors providing information or data indicative of the actions of the operator. Additionally or alternatively, the moving direction $\overline{Q}$ or the velocity $\overline{V}$ may be determined based on control signals related to the actuators and their control circuits, e.g. the control signals generated by the control unit 50 to control the valves in the control circuit. It should be noted that the predetermined point is preferably the tip P of the boom 20 to which the tool 30, e.g. via an actuator 32, is connected. Alternatively, the predetermined point may be located in the tool 30 or elsewhere in the boom 20 at a point moving to the same direction, or substantially the same direction, as the moving tool 30.

As will be detailed below, the position of the predetermined point in a boom, e.g. the tip P of the boom 20 depends on the angular relationships of the boom sections of the boom and the dimensioning of the boom sections, i.e. the length of each boom section. According to an example and FIG. 1a, the angular relationships may be represented by using the azimuth angle $\alpha_1$ of boom 20 effected by the slewing apparatus 22, the altitude angle $_2$ of the second boom section 26, and the angle $\alpha_3$ between the first and second boom sections 24 and 26. The altitude angle $\alpha_2$ represents the angle between the base section 28 and the second boon section 26 or the altitude angle of the second boon section 26. Additionally, an altitude angle of the boom 20 or the base section 28 effected by the tilting apparatus may be determined. For example, a point on the axis N may be used as a reference point and additional reference points, e.g. the machine location R, the predetermined part of the work machine or the cabin 14 as explained above, may be used to determine the absolute or relative position of the predetermined part, e.g. the tip P of the boom 20. The angles $\alpha_1$, $\alpha_2$ and $\alpha_3$ may be measured e.g. with angular sensors or acceleration sensors.

Several sensors, optionally of different types, can be used in combination. Furthermore statistical techniques, such as averaging, can be used for improved accuracy. Thus, the information indicative of the quantities mentioned above in the various examples can be provided by at least one, preferably many, sensors chosen from a set of sensors, the set of sensors comprising acceleration, position, velocity, angle, and length sensors. The operational principle of such sensors is wide; e.g. optical, electro-optical, mechanical, electro-mechanical, electrical, and resistive sensors may be used.

Relating to the example case shown in FIG. 1a and the examples explained above, at least one of the following sensors may be in use: the orientation sensor 41, an acceleration sensor 42 for measuring the acceleration of e.g. the tip P of the boom, a position sensor 43 for measuring the location of e.g. the tip P of the boom, an angular sensor 44 for measuring the angle α3 between the boom sections 24 and 26, an angular sensor 45 for measuring the altitude angle α2 of the boom section 26 about a horizontal direction, an angular sensor 46 for measuring angles related to the slewing apparatus 22 or the azimuth angle α1 of the boom 20 about a vertical direction, e.g. the axis N, a length sensor 47 for measuring the length of a telescopic boom section, a length sensor 48 for measuring the length of a boom section, an acceleration sensor 49 for measuring the angle of a boom about a horizontal direction and an angle sensor for measuring angles related to the tilting apparatus.

The presented solution is not limited to the examples and embodiments explained above or presented with reference to the figures. The presented solution is defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

The invention claimed is:

1. A method for controlling a tool pivotably mounted to an articulated boom such that the tool is rotated about a rotation axis that is oriented vertically or substantially vertically, the boom being connected to a work machine having a control unit, the method comprising:
   automatically determining a moving direction in which a predetermined point of one of the boom and the tool is moving; and
   automatically controlling, under control of the control unit, an orientation of the tool as a function of one or more predetermined dependencies, the one or more predetermined dependencies defining at least the orientation of the tool in relation to the moving direction.

2. The method according to claim 1, wherein a velocity of the predetermined point is determined together with the moving direction.

3. The method according to claim 1, wherein the predetermined point is one of a tip of the boom and a point of the boom the tool is connected to.

4. The method according to claim 1, wherein the step of determining the moving direction further includes:
   receiving in the control unit information indicative of the moving direction of the predetermined point; and
   automatically determining the moving direction as a function of the received information.

5. The method according to claim 1, wherein the step of controlling the orientation of the tool further includes:
   receiving in the control unit information indicative of the orientation of the tool; and
   automatically generating in the control unit control signals for controlling one or more actuators orienting the tool.

6. The method according to claim 1, further comprising:
   controlling an opening direction of the tool in relation to the moving direction as a function of the one or more predetermined dependencies, wherein the opening direction is defined as a predetermined direction from which the tool can receive an object.

7. The method according to claim 1, further comprising: controlling a holding direction of the tool in relation to the moving direction as a function of the one or more predetermined dependencies, wherein the holding direction is defined as a longitudinal direction of an object that can be handled by the tool.

8. The method according to claim 7, further comprising: controlling the holding direction of the tool further such that the one or more predetermined dependencies further define the holding direction in relation to at least one of the longitudinal direction of the object to be handled by the tool at a target location for the tool, and an orientation of a predetermined object at the target location for the tool.

9. The method according to claim 1, wherein the tool has, for handling objects, an open position for receiving and releasing objects and a closed position for holding objects, the method further comprising:
for controlling the orientation of the tool, automatically selecting by the control unit the one or more predetermined dependencies based on whether the tool is in the open position or the closed position, and further based on the moving direction.

10. The method according to claim 1, further comprising at least one of:
generating a warning signal observable by an operator of the work machine; and
automatically disabling the functioning of the tool;
wherein the at least one generating and disabling step is taken when a holding direction of the tool, defined as a longitudinal direction of an object handled by the tool, has a predetermined orientation in relation to a direction from the predetermined point to a predetermined part of the work machine.

11. The method according to claim 1, further comprising at least one of:
receiving in the control unit information indicative of the moving direction of the predetermined point from one or more sensors located in the boom; and
receiving in the control unit information indicative of the orientation of the tool from one or more sensors located at the tool.

12. A system for controlling a tool pivotably mounted to an articulated boom such that the tool is configured to rotate about a rotation axis that is oriented vertically or substantially vertically, the boom being connected to a work machine, the system comprising a control unit configured to:
automatically determine a moving direction that a predetermined point of one of the boom and the tool is moving;
automatically control an orientation of the tool as a function of one or more predetermined dependencies, the one or more predetermined dependencies defining at least the orientation of the tool in relation to the moving direction; and
generate control signals for controlling one or more actuators configured to orient the tool according to the one or more predetermined dependencies.

13. The system according to claim 12, further comprising: one or more sensors located in at least one of the boom and the tool and operably connected to the control unit, wherein the control unit is configured to receive information from the one or more sensors indicative of at least one of the moving direction of the predetermined point and the orientation of the tool.

14. A work machine, particularly a forest machine, having an articulated boom, a tool and a system for controlling the tool pivotably mounted to the articulated boom such that the tool is configured to rotate about a rotation axis that is orientated vertically or substantially vertically, the boom being connected to the work machine, the system comprising a control unit configured to:
automatically determine a moving direction that a predetermined point of one of the boom and the tool is moving;
automatically control an orientation of the tool as a function of one or more predetermined dependencies, the one or more predetermined dependencies defining at least the orientation of the tool in relation to the moving direction; and
generate control signals for controlling one or more actuators configured to orient the tool according to the one or more predetermined dependencies.

15. A non-transitory computer-readable medium storing program code, the program code, when run in a control computer, configured to execute the steps of a method for controlling a tool pivotably mounted to an articulated boom such that the tool is rotated about a rotation axis that is oriented vertically or substantially vertically, the boom being connected to a work machine having a control unit, comprising:
automatically determining a moving direction that a predetermined point of one of the boom and the tool is moving; and
automatically controlling, under control of the control unit, an orientation of the tool as a function of one or more predetermined dependencies, the one or more predetermined dependencies defining at least the orientation of the tool in relation to the moving direction.

* * * * *